United States Patent [19]

Golden

[11] Patent Number: 4,885,749

[45] Date of Patent: Dec. 5, 1989

[54] DATA TRANSMISSION WITH IMPROVED MESSAGE FORMAT

[75] Inventor: Glenn D. Golden, Tinton Falls, N.J.

[73] Assignees: American Telephone and Telegraph Company, New York, N.Y.; AT&T Information Systems Inc., Morristown, N.J.

[21] Appl. No.: 137,996

[22] Filed: Dec. 28, 1987

[51] Int. Cl.⁴ .................. G08C 25/00; G06F 11/10
[52] U.S. Cl. ...................... 371/32; 371/47.1; 375/106
[58] Field of Search .............. 371/32, 33, 37, 47; 370/85, 91, 94, 99, 100

[56] References Cited

U.S. PATENT DOCUMENTS

| | | |
|---|---|---|
| 4,377,862 | 3/1983 | Koford et al. .................. 371/32 |
| 4,422,171 | 12/1983 | Wortley et al. ................ 371/32 |
| 4,439,859 | 3/1984 | Donnan ........................ 371/32 |
| 4,507,782 | 3/1985 | Kunimasa et al. ............... 364/32 |
| 4,511,958 | 4/1985 | Funk ........................... 364/200 |
| 4,691,314 | 1/1987 | Bergins et al. ................. 371/32 |

Primary Examiner—Charles E. Atkinson
Attorney, Agent, or Firm—Ronald D. Slusky

[57] ABSTRACT

In a voiceband data multipoint network, each tributary modem transmits, in a trailer which follows the user data, a tributary modem identification, a sequence number which advances for each start-up and a checksum. The observation at the receiver of a gap in the series of sequence numbers in messages determined to have originated from a particular tributary modem is used to accurately compute a missed message rate for that modem.

20 Claims, 6 Drawing Sheets

DATA TRANSMISSION WITH IMPROVED MESSAGE FORMAT

BACKGROUND OF THE INVENTION

The present invention relates to data communications.

In data communications arrangements, such as voiceband multipoint networks, the so-called user data transmitted from one modem to another is preceded by a header which contains signals, or information, used by the modems themselves, herein referred to as "modem-to-modem data". The modem-to-modem data in the header may include, for example, (a) an address or other identification of the transmitting modem used in multipoint applications for so-called coefficient "jam setting" or to maintain various diagnostic parameters on a per-tributary-modem basis, (b) a sequence number such as taught in my co-pending U.S. patent application, serial number 137,995 entitled "Measurement of Missed Start-Up Rate and Missed Message Rate," assigned to the assignee hereof and filed of even data herewith, and/or (c) a checksum used in the receiver to determine whether the address, sequence number or other header data was correctly recovered.

SUMMARY OF THE INVENTION

In accordance with the present invention, it has been recognized that in some applications it is possible and advantageous to provide modem-to-modem data in a trailer that follows the user data rather than providing it in a header ahead of the user data as is done in the prior art. A particular advantage of this approach is that it minimizes the so-called RS-CS delay, this being the time between when the data processing/communication equipment associated with a tributary modem raises its request-to-send (RS) lead—indicating to the modem that it wishes to transmit a message—and the time that the modem responds by raising its clear-to-send (CS) lead—indicating that the modem is ready to transmit that data.

Moreover, providing modem-to-modem data in a trailer can enhance the diagnostic capabilities of a modem network. For example, the trailer may conclude with a checksum taken over not only the modem-to-modem data therein, but also the user data which precedes the trailer. As taught in my aforementioned co-pending U.S. patent application, having such a checksum makes it possible for, say, the control modem in a multipoint network to maintain an accurate diagnostic parameter referred to as the "missed message rate".

BRIEF DESCRIPTION OF THE DRAWING

In the drawing,

FIG. 6, show a flowchart of operations performed in a tributary modem in the system of FIG. 1; FIG. 8, show a flowchart of operations performed in the control modem in the system of FIG. 1.

DETAILED DESCRIPTION

Figure 1:
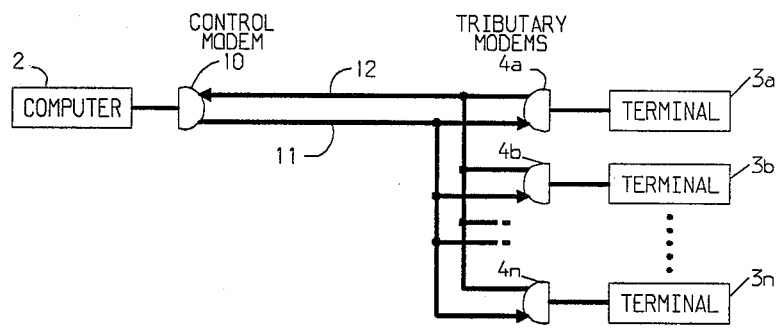
FIG. 1 shows a multipoint voiceband data communications system in which the present invention is illustratively implemented.

FIG. 1 depicts a multipoint voiceband data communications system, or network, in which the present invention is used. In particular, a computer 2 communicates on a time-shared basis with a plurality of data terminals 3a, 3b, ..., 3n. A control modem 10 is associated with computer 2. Tributary modems 4a, 4b, ..., 4n are associated with terminals 3a, 3b, ..., 3n, respectively. The system communicates data on a full-duplex basis. Thus, computer 2 transmits information to the various terminals on a broadcast basis via modem 10, the outbound path 11 of a four-wire multipoint private voiceband telephone line, and the various modems 4a, 4b, ..., 4n. An individual one of the terminals 3a, 3b, ..., 3n transmits information to computer 2 via its associated modem, the inbound path 12 of the multipoint private voiceband telephone line, and modem 10.

Modems 4a, 4b, ..., 4n and 10 provide several functions. One is to modulate the data to be communicated into, and to demodulate it out of, the passband of paths 11 and 12. Another is to correct for distortion and other channel irregularities which may cause, for example, intersymbol interference.

In carrying out the latter function, the modems of FIG. 1 use so-called "receive" equalization for so-called "outbound" communications from control modem 10 to the tributary modems 4a, 4b, ..., 4n over path 11. Here, the receiver portion of each tributary modem includes an adaptive equalizer through which the received line signal is passed. The equalizer is realized in the form of a transversal filter, whose so-called "tap" coefficients are adapted to the characteristics of the channel in question, thereby enabling the equalizer to remove most of the channel-induced distortion.

Receive equalization is also typically used in multipoint networks for communications in the other, "inbound", direction. (As will be discussed shortly, however, tributary-to-control communications in the network of FIG. 1 is carried out using so-called "transmit" equalization.) Although generally satisfactory, receive equalization engenders a significant RS-CS delay at the tributary modems, that delay being the time between when the terminal associated with a particular tributary modem raises its request-to-send (RS) lead—indicating that it wishes to communicate a message to computer 2—and the time that the modem responds by raising its clear-to-send (CS) lead—indicating that the tributary modem is ready to transmit that data. The source of receive equalization's relatively large RS-CS delay is the fact that before transmission of data from a particular tributary modem can begin, a set of coefficients appropriate for communications with that tributary modem must be provided in the control modem receiver equalizer, and a certain amount of time is required to do this.

For example, during the RS-CS interval the tributary modem may send to the control modem a training data sequence—thereby enabling the control modem to "re-learn" the channel for each transmission—prior to the transmission of user data. The RS-CS delay is thus at least as large as the time required to transmit the training sequence. Alternatively, the control modem may store the coefficients, once learned, for the channel from each tributary and then, when an inbound message arrives, load the appropriate coefficient set into the equalizer. Although this stored coefficient approach obviates the need to wait for the equalizer to re-learn the channel, it nonetheless engenders a not-insignificant RS-CS delay as well, because the tributary modem must identify itself to the control modem in order for the latter to load in the proper set of coefficients. Since the channel will not have been equalized at that point in time, the tributary modem must transmit its identity at a relatively slow data rate so that it can be recovered at the control modem without equalization.

(One possible receive equalization approach that does not engender any significant RS-CS delay relies on the fact that in virtually all multipoint applications, the data terminal or other data processing equipment associated with the tributary modems does not attempt to communicate inbound messages to the computer or other equipment associated with the control modem unless the latter polls it. It is thus possible to have the control modem monitor the outgoing polls at the computer/modem interface and determine the identity of the polled tributary from the address contained in each poll. Armed with this knowledge, the control modem could immediately retrieve the appropriate set of previously learned coefficients and, again, load them into the equalizer without having to receive a low-speed address from the tributary modem. A drawback of this approach, however, is the fact that it necessitates customization of the modem to take account of the particular data transmission protocol being used by the data processing equipment.)

In order to minimize the RS-CS delay, then, the system of FIG. 1 uses so-called transmit equalization such as that described in U. S. Pat. No. 4,489,416 issued Dec. 18, 1984 to R. L. Stuart. As with receive equalization, transmit equalization initially entails the provision of an adaptive equalizer in the receiver portion of the control modem. However, once the set of coefficients that will equalize the channel from a particular tributary modem—say modem 4a—to the control modem 10 has been determined in modem 10, the values of those coefficients are communicated to modem 4a. Modem 4a, in turn, thereafter uses the coefficients to predistort its transmitted line signal, in a sense anticipating the distortion that will be introduced by the channel. The signal received from modem 4a by modem 10 is thus relatively distortion-free.

Figure 2:
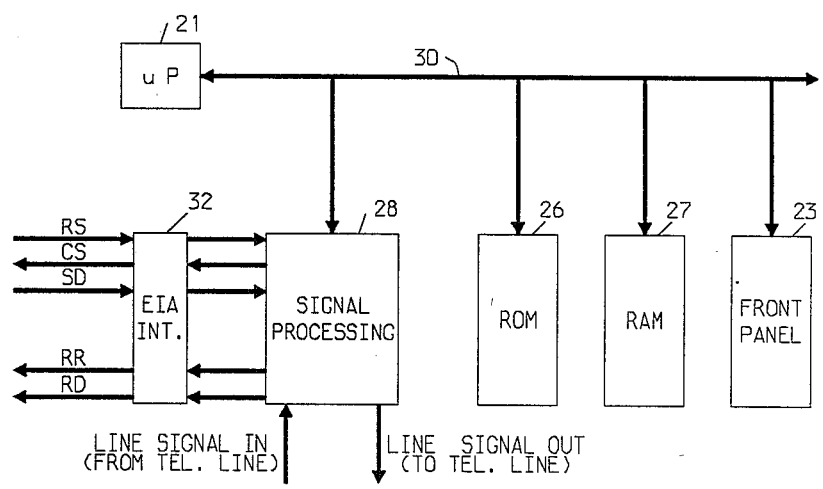
FIG. 2 is a block diagram showing the architecture of the modems used in the system of FIG. 1.

Modems 4a, 4b, . . . , 4n and 10 illustratively share a common architecture, which architecture is shown in FIG. 2. In particular, each modem operates under the control of a microprocessor 21 which communicates with a number of peripheral devices via a system of address, data and control leads indicated generically at 30. The peripheral devices include front panel circuitry 23, ROM 26, and RAM 27 and signal processing module 28. The latter performs the real-time functions of, for example, (a) coding and modulating the user data, the latter being supplied to the modem on the send data (SD) lead of RS-232 interface 32 and being delivered by the modem to the multipoint private line and (b) decoding and demodulation of line signals presented to the modem from the multipoint private line, the recovered data thereupon being presented to the user on the received data (RD) lead. In performing the above-mentioned modulation function, in particular, module 28 represents the user data and modem-to-modem data using a predetermined alphabet of quadrature amplitude modulated (QAM) signal points in a two-dimensional signal space. Signal processing module 28 further performs the aforementioned transmit and receive equalization functions. Among the other leads extending to and from interface 32 are the aforementioned RS and CS leads and a receiver ready (RR) lead which, when active, indicates the presence of valid received data on the RD lead. Module 28 is illustratively realized as an ensemble of appropriately programmed digital signal processing chips.

Figure 3:
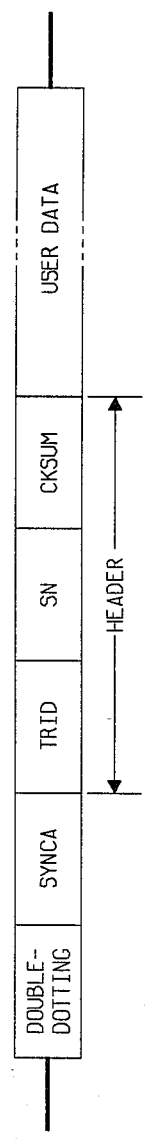
FIG. 3 shows a message format in which the modem-to-modem data is contained in a header as in the prior art.

FIG. 3 shows a message format that could be used for communications from one of tributary modems 4a, 4b, . . . , 4n of FIG. 1 to control modem 10. This format could be used once the control data set receive equalizer had been trained and the resulting coefficient values would have been communicated to the tributary modem as described above. In particular, the message includes a start-up sequence comprised of a predetermined interval of a "double-dotting" signal of the form A,A,−A,−A, . . . . Here A is illustratively a predetermined quadrature amplitude modulated (QAM) signal point in the two-dimensional signal space that is not a member of the aforementioned alphabet used to convey the user and modem-to-modem data. The function of the double-dotting signal is to allow the receiver in the control modem to acquire certain signal parameters necessary to ensure proper demodulation of the following data symbols, such parameters including, for example, the receiver gain setting, the baud sampling phase and the carrier phase angle. This start-up sequence is followed by a predetermined synchronization signal, SYNCA, which illustratively consists of the sequence A,A,A transmitted after a −A,−A of the start-up sequence. The function of SYNCA is to delimit the end of the start-up sequence and the beginning of a header sequence, also referred to herein simply as a header.

The header sequence is comprised of three pieces of modem-to-modem information: a tributary identification TRID, a sequence number SN and an error-checking code word—illustratively a checksum CKSUM. Tributary identification TRID uniquely identifies the particular transmitting tributary modem and sequence number SN is a number that is advanced by unity in each successive message transmitted by the tributary modem in question. Checksum CKSUM is a checksum computed over TRID and SN and is used in the control modem as information enabling the control modem to determine that it has correctly recovered TRID and SN. The checksum is followed by the user data represented by a stream of QAM symbols taken from the aforementioned alphabet.

Figure 4:
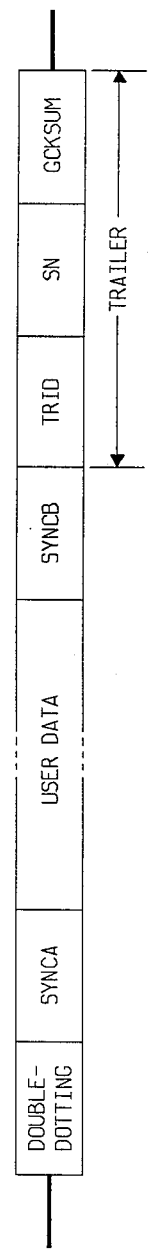
FIG. 4 shows a second message format of the type used in accordance with the present invention.

The format of FIG. 3 is characteristic of the prior art formats in that places the modem-to-modem data ahead of the user data. FIG. 4 shows an alternative message format embodying the principles of the invention. Specifically, the format of FIG. 4 provides the following in a trailer which follows the user data: TRID, SN and a "global" checksum GCKSUM, the latter being a function of not only TRID and SN, but also the user data as well.

In particular, the message format of FIG. 4 includes a start-up sequence again comprised of a predetermined interval of a "double-dotting" signal, followed by synchronization signal, SYNCA, the user data, again represented by a stream of QAM symbols taken from the aforementioned alphabet, and a second synchronization signal SYNCB. The latter delimits the end of user data and must be a signal which has a very small probability of being interpreted as user data. Illustratively, SYNCB is a sequence of QAM signal points which are not part of the aforementioned alphabet used to represent user data and which may be different from the aforementioned signal points "A" and "−A". SYNCB is followed by the aforementioned trailer. (SYNCB is excluded from the checksum because this eliminates a possible source of complexity in maintaining a correct checksum in the face of transmission errors which may cause a symbol carrying user data to be erroneously interpreted as one of the signal points which comprise SYNCB.)

There are at least two advantages to providing this modem-to-modem data in a trailer, in accordance with the invention, rather than in a header as in the prior art.

Firstly, the tributary modem RS-CS delay can be made significantly shorter than if such information were to be conveyed in a header. This is, of course, a consequence of the fact that the header precedes the user data and thus the modem cannot begin to transmit the latter until it has transmitted the former. Providing the information in a trailer, however, advantageously eliminates this source of delay because placing the modem-to-modem data following the user data allows certain time delays inherent in the operation of multipoint polling networks to be exploited.

Assume, for example, that computer 2 is currently receiving a message from terminal 3a via their respective associated modems. Upon receipt of SYNCB of that message, control modem 10 makes lead RR inactive. Computer 2, upon observing this or other indicium of the end of user data from terminal 3a, can begin to poll another terminal, say terminal 3b, even though the trailer of the message from terminal 3a is still being received. The still incoming trailer and the new outgoing poll to terminal 3b thus overlap in time. (They do not collide, however, because the control and tributary modems communicate over full-duplex channels.)

In addition, it may appear that the trailer from modem 4a could potentially collide with the start-up sequence from modem 4b, since the terminal associated with the latter is being polled while the trailer from modem 4a is still arriving. Indeed, if terminal 4b raised its RS lead while the trailer from 4a were still being transmitted, a collision would, in fact, occur. However, there are sources of delay associated with the transmission of each polling sequence, for example, propagation delay through the transmitter of control modem 10 and the receiver of tributary modem 4b. These delays engender a minimum time interval between the time the last bit of a poll sequence is supplied by computer 2 to control modem 10, and the time that same bit appears at the RD lead of modem 4b, the latter time being the earliest possible time that terminal 3b could raise its RS lead in response to the poll, thus causing modem 4b to initiate a start-up sequence. In practice, this minimum time interval is considerably longer than the time necessary to transmit SYNCB and the trailer, and so the hypothetical collision does not occur.

In summary, then, placing the modem-to-modem information in a trailer, rather than in a header, exploits these inherent delays, allowing the time used in transmitting modem-to-modem data to overlap in time with outbound polling sequences.

A second advantage in this particular application to having the modem-to-modem data in a trailer is that since GCKSUM is provided subsequent to the user data and can thus be taken over that data as well as TRID and SN, the control modem is able to determine that not only TRID and SN were correctly recovered, but that the user data was correctly recovered as well. As discussed in the above-mentioned co-pending U.S. patent application, this, in turn, allows the control modem to keep an accurate measure of a tributary modem performance parameter referred to herein as the "missed message rate". This parameter indicates the percentage of entire mesages which were not received error-free. (With the format of FIG. 3, by contrast, the control modem would only be able to measure the so-called missed start-up rate, this being an indication only of how many headers were not received error-free.)

Figure 5:
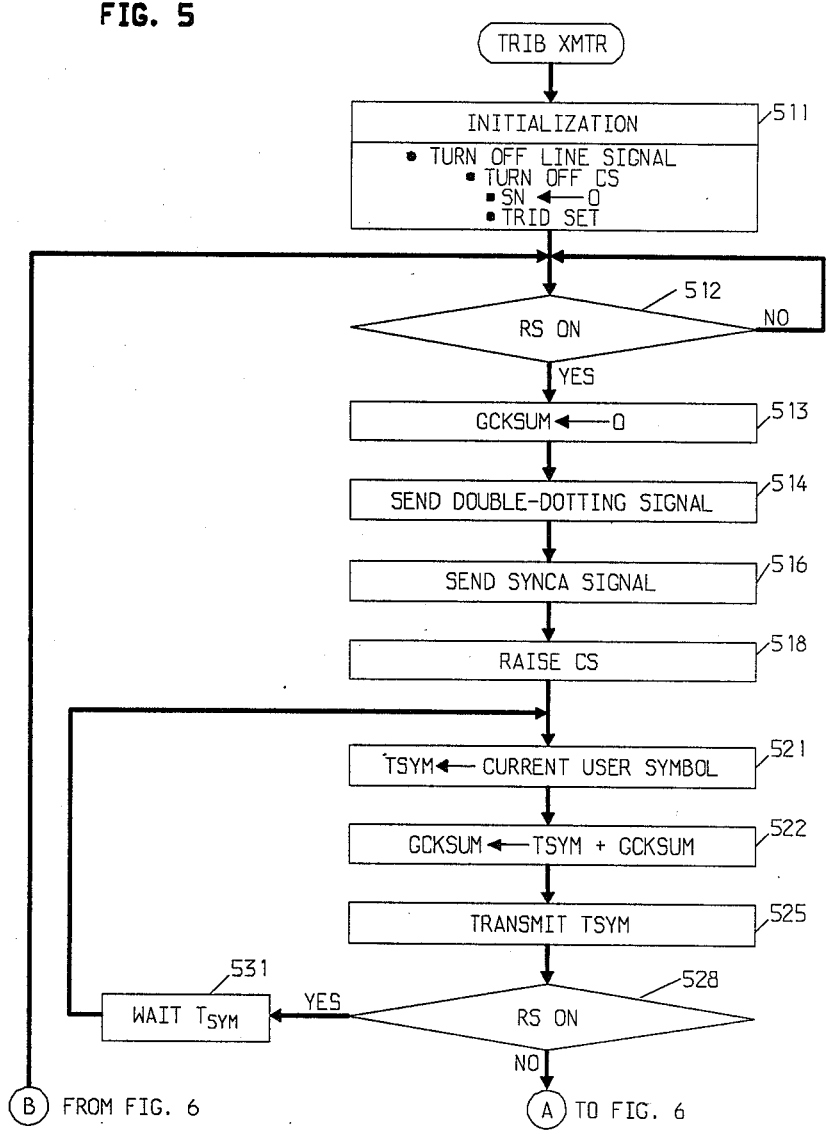
FIGS. 5 and 6, when arranged with FIG. 5 above
Figure 6:
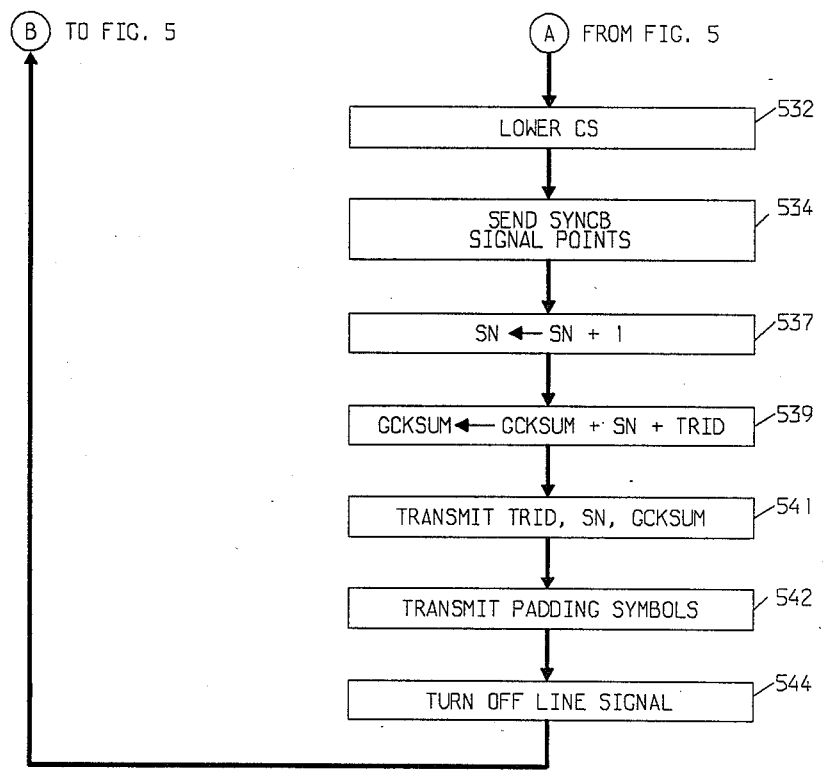

The flowchart of FIGS. 5-6 depicts the operations performed in an individual one of tributary modems 3a, 3b, . . . , 3n in creating a message of the type shown in FIG. 4. Depending on the particular implementation, any of the various steps of the flowchart may be performed within microprocessor 21, signal processing module 28 or some combination, as desired. (The modem performs many other functions which, because they do not relate to the message creation function, are not shown in the FIGS.)

When the modem is, for example, first turned on, it performs a number of initialization functions, as indicated at 511. These functions include turning off its line signal, i.e., the signal on path 12, turning off, or lowering, its CS lead, initializing to zero the k-bit sequence number variable SN and interrogating front panel circuitry 23 to determine tributary identification TRID. (The notation SN<—0 within block 511 and elsewhere in the FIGS. means "assign the value 0 to SN".)

At this point, control passes to block 512, from which it exits when lead RS extending from EIA interface 32 is raised, or turned on, by the associated data terminal. Once this occurs, the modem initializes to zero a p-bit checksum variable GCKSUM at block 513, and then transmits double-dotting and SYNCA, as indicated at 514 and 516, respectively. The modem is now ready to transmit user data so it raises its CS lead, as indicated at 518. It then enters a loop during which the user data is transmitted.

In particular, as indicated at 521, the modem generates a binary word TSYM identifying which particular symbol in the predetermined data symbol constellation is to be next transmitted. The value of TSYM is arrived at by performing such tasks as taking in a predetermined number of user-supplied data bits from lead SD, scrambling and differential and/or convolutional coding. The value GCKSUM, which is illustratively a simple additive checksum (although other error-checking codes could be used instead), is thereupon updated at block 522 by simply adding to it, modulo $2^p$, the value of TSYM. The value of TSYM is then mapped into a particular channel symbol, which is thereupon transmitted, as indicated at 525. As long as it is determined at block 528 that the RS lead is still active, the modem waits at block 531 for a period equal to the symbol interval $T_{SYM}$, and then returns to block 521 to process further user data.

Once it has been determined that the RS lead has been lowered, the modem lowers the CS lead and transmits SYNCB, as indicated at 532 and 534, respectively. As previously mentioned, SYNCB is comprised of a sequence of QAM signal points which are not used to represent user data. The QAM coordinate values of the SYNCB signal points are stored as an array in ROM 26, where they are denoted SYNCB[1], SYNCB[2], . . . , SYNCB[m]. SN is then incremented at block 537.

Continuing at block 539, assembly of the message trailer begins by first updating the value of GCKSUM by adding to it, modulo $2^p$ the values of SN and TRID. The stream of bits formed by concatenating TRID, SN and GCKSUM is thereupon divided into blocks which are then mapped into M individual channel symbols, illustratively without scrambling, differential encoding or other such processing. (If convenient in a particular implementation, such processing could, alternatively, be performed.) As indicated at 541 and 542, those channel symbols are thereupon transmitted, followed, in conventional fashion by a stream of padding symbols (not shown in FIGS. 3 and 4), whose presence ensures that the so-called post-cursors of the previously transmitted symbols are not terminated prematurely. (It may be noted that the stream of padding symbols, which might be characterized as a kind of trailer in general sense, is fundamentally different from the trailer of the present invention in that the padding symbols are non-information-bearing. The data in the trailer of the present invention, by contrast, is, in fact, information-bearing. Specifically, it will often, although perhaps not always, be the case that the trailer information identifies one or more characteristics of the message being communicated, such as the source of the message (e.g., TRID); the position of the message in the overall string of messages communicated from that modem (SN); or a numerical value derived from the values of the bits that comprise the message (GCKSUM).)

Finally, as indicated at 544, the modem again turns off its line signal and control returns to block 512.

Figure 7:
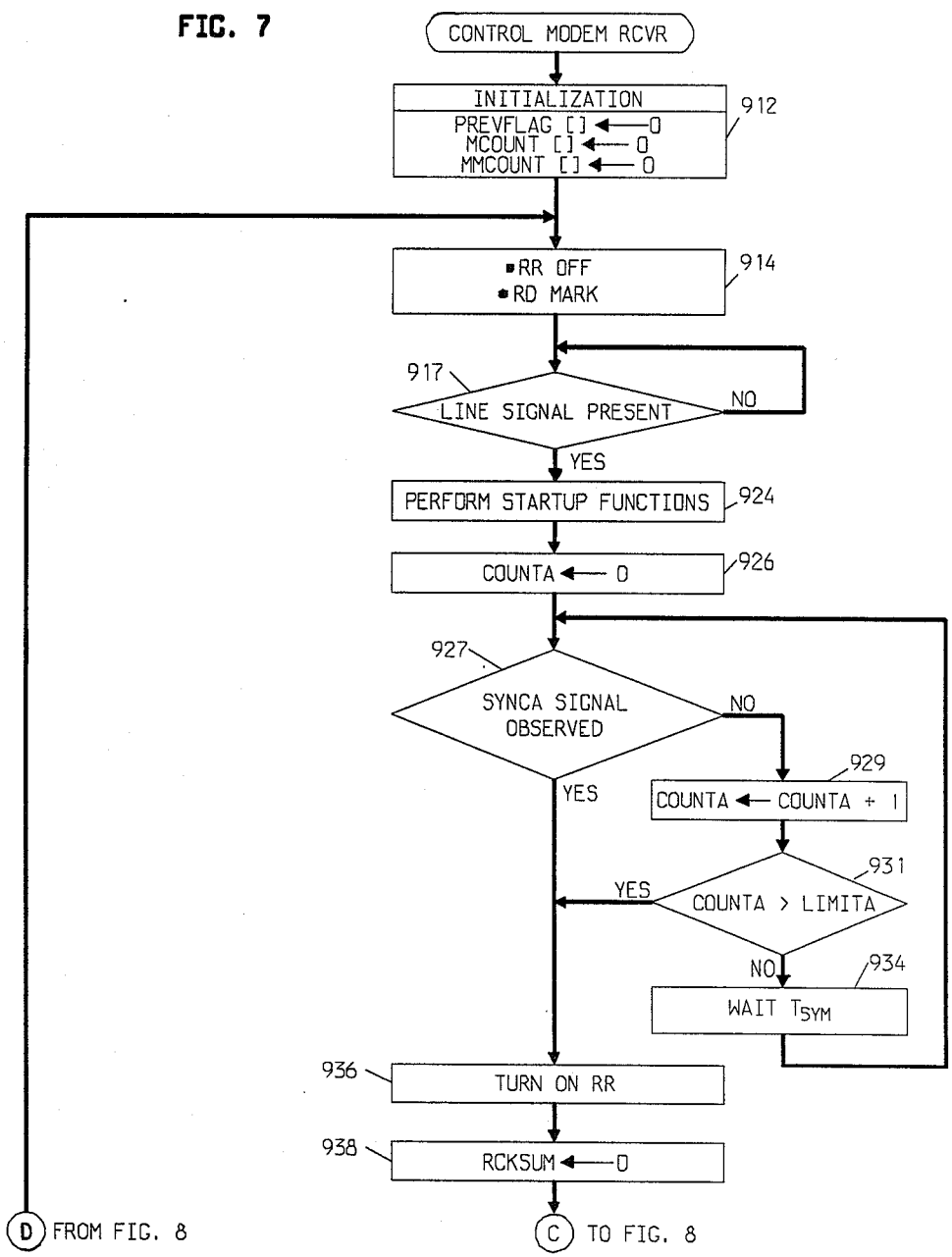
FIGS. 7 and 8, when arranged with FIG. 7 above
Figure 8:
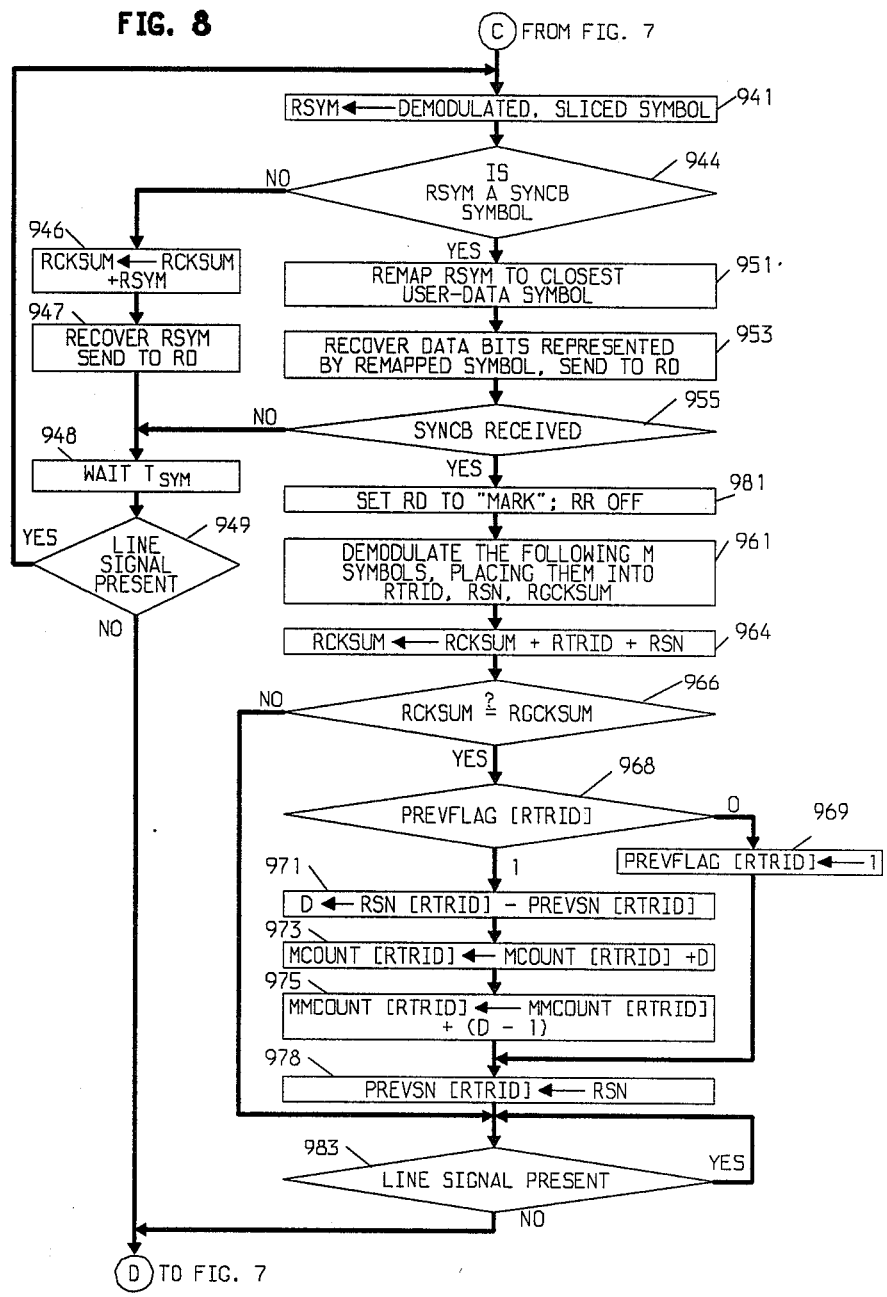

The flowchart of FIGS. 7-8 depicts the operations performed in a control modem 10 in processing a message of the type shown in FIG. 4 received from a particular tributary modem. Again, depending on the particular implementation, any of the various steps of the flowchart may be performed within microprocessor 21, signal processing module 28 or some combination, as desired. (And also again, it will be appreciated that the modem performs many other functions which, because they do not relate to the message processing function, are not shown in the FIGS.)

As indicated at 912, the modem begins by initializing to zero three arrays, PREVFLAG[], MCOUNT[] and MMCOUNT[] whose use will be explained in the sequel. The modem thereupon "arms" itself for a start-up by performing a number of actions at block 914. These include lowering the RR lead and setting the RD lead to the "mark", or idle, state. Control then passes to block 917 from which it exits when line signal energy is detected. Acting on the assumption that this initial portion of the line signal is a double-dotting signal, the modem proceeds to perform a number of start-up functions, as indicated at block 924. These functions principally comprise the acquisition of the aforementioned signal parameters such as receiver gain setting, baud sampling phase and carrier phase angle. At a predetermined time after line signal energy is detected, it is presumed that these parameters have been determined with sufficient accuracy to allow for the accurate demodulation of what follows, beginning with any remaining double-dotting signal points and SYNCA.

In order to detect the presence of SYNCA, the modem begins, as indicated at 926 by initializing a variable COUNTA to zero. It is thereupon determined at 927 whether SYNCA has, in fact, arrived. It does this by examining the most recently demodulated signal point and determining whether it, in combination with the four previously demodulated signal points, comprises the sequence $-A,-A,A,A,A$. If it does, SYNCA has arrived and control passes to block 936, at which point lead RR is raised, indicating to computer 2 the start of user data. If, on the other hand, SYNCA has not yet arrived, the variable COUNTA is incremented at 929 and its value is then tested at 931. If it is found that COUNTA now exceeds a predetermined limit LIMITA—whose value is chosen taking into account the predefined length of the double-dotting signal—it is assumed that, as the result of noise or other channel disturbances, SYNCA has been missed and that user data has begun. It is likely that the initial part of the subsequent block of user data has already passed. Control nonetheless passes to block 936. The (higher-level) data dommunications protocol being used by computer 2 and terminals 3a, 3b, . . . , 3n will detect the corrupted block and deal with the situation by, for example, requesting a retransmission. Finally, if COUNTA is less than LIMITA, the modem waits at block 934 for a period equal to $T_{SYM}$ and then returns to block 927.

Following block 936, a variable RCKSUM is initialized to zero at block 938, this variable holding the value of the checksum of the received symbols as accumulated up to any particular point in time. The first received signal point is then sliced at block 941 using an "expanded" signal constellation which includes not only the alphabet of allowable user-data-bearing data symbols but also the aforementioned symbols which make up SYNCB. The sliced signal point, RSYM, is then examined at block 944 to determined whether it is one of those SYNCB symbols. If it is not, control passes to block 946 at which the value of RCKSUM is updated by the value of RSYM. The data bits represented by RSYM are thereupon recovered at block 947—the processing at that block encompassing such steps as equalization, demodulation, differential and/or trellis decoding, and descrambling—and the recovered bits are delivered to the user on lead RD. The modem then waits a period equal to $T_{SYM}$ at block 948. As long as line signal is still present, as determined at block 949, processing returns to block 941.

Returning, now to block 944, if, contrary to the previous assumption, it is determined that RSYM is a SYNCB symbol, processing proceeds at block 951. Here we take into account the fact that we may, in fact, not actually be in the process of receiving SYNCB but, rather, have received a user-data-bearing symbol which was, for example, corrupted in the channel and now appears as a SYNCB symbol. In order to minimize the effects of such corruption in the recovered data delivered to the user, the modem identifies the symbol in the transmitted constellation closest to RSYM and, as will be seen, proceeds to deliver to the user the data that the "remapped" symbol represents. If it turns out that the transmitted symbol was, in fact, user-originated, so much the better. If, on the other hand, a SYNCB symbol was actually transmitted, there is no real harm done in having remapped it because in typical data communications arrangements, computer 2 will have already recognized the end of the user data block and will ignore the data represented by the remapped symbol.

At block 953, the remapped symbol is thereupon processed as at block 947 to recover the user data bits. Processing then proceeds at block 955 at which it is determined whether the unmapped received symbol in combination with the symbols received immediately before it comprise SYNCB. If they do not, processing proceeds to block 948 as aforesaid. Otherwise, it is assumed that SYNCB has arrived and, at block 981, RD is set to "mark", lead RR is lowered and trailer processing proceeds.

Specifically, the trailer is illustratively carried by M data symbols, as previously mentioned, which are processed at block 961 to recover the bits in the trailer. These bits are thereupon grouped into words corresponding to TRID, SN and GCKSUM. Inasmuch as the values of these words as recovered may, through, for example, channel disturbances, be different from their values as transmitted, they are here denominated RTRID, RSN and RGCKSUM, respectively.

The running checksum RCKSUM that was being updated at block 946 during the receipt of user data is now further updated at block 964 to include the values of RTRID and RSN. If the message was received error-free, then RCKSUM should be equal to RGCKSUM. Indeed, the values of these two variables are now compared at block 966.

If RCKSUM and RGCKSUM are not equal, then one or more errors occurred during the transmission of user data, SYNCB, TRID, SN or GCKSUM. The modem thereupon enters block 983, from which it exits and returns to block 914 when line signal is no longer present.

If, on the other hand RCKSUM and RGCKSUM are equal, then the message is assumed to have been recovered error-free. Thus the values of RTRID and RSN are assumed valid and we can proceed to perform missed message rate processing.

In carrying out that processing, control modem 10 maintains the aforementioned three arrays PREV-FLAG[], MCOUNT[] and MMCOUNT[] as well as a fourth array PREVSN[], with the $i^{th}$ element of each array being associated with the $i^{th}$ one of tributary modems 4a, 4b, ..., 4n. In particular, PREVFLAG [i] has the value "0" if no error-free message has yet been received from the $i^{th}$ tributary modem and "1" otherwise; MCOUNT[i] contains the total number of messages received from the $i^{th}$ tributary modem, that number being inferred from the missed message processing about to be described; MMCOUNT[i] contains the number of missed messages from the $i^{th}$ tributary modem, that number again being inferred from the missed message processing; and PREVSN[i] is the value of the sequence number RSN contained in the last error-free message received from the $i^{th}$ tributary modem.

Beginning at block 968, the value of PREVFLAG[RTRID] is checked. If it is "0", indicating that this is the first error-free message received from the tributary modem identified by RTRID, there is, in general, no basis for knowing whether any previous messages from that tributary modem were missed. At this time, then, the modem simply sets PREVFLAG[RTRID] to "1" and records the current value of RSN in PREVSN[RTRID] at blocks 969 and 978, respectively, and then proceeds to block 983 to await the loss of line signal at the end of the current message.

If, on the other hand, the value of PREVFLAG[RTRID] is "1", indicating that a previous error-free message was received from the tributary modem identified by RTRID, processing proceeds to block 971. Here the difference between RSN[RTRID] and PREVSN[RTRID], denoted D, is computed (taking into account the wraparound of RSN[RTRID], which can only take on $2^k$ different values). Since the sequence numbers transmitted from a particular tributary modem illustratively advance by unity for each successive transmitted message, the value of D represents the number of messages that were transmitted—including the current message—since the last error-free message was received from that tributary modem. In addition, the quantity (D - 1) represents the number of intervening non-error-free messages which have occurred since the last error-free message was received. For example, assume RSN from the RTRID$^{th}$ tributary modem is 12 and PREVSN[RTRID] is 8. Thus, D=4, from which we learn that (a) the currently received message is the 4$^{th}$ one transmitted by the RTRID$^{th}$ tributary modem since control modem 10 last received an error-free message from that particular tributary modem and (b) the three intervening messages contained one or more errors.

In view of the foregoing, the modem thus proceeds to update the values of MCOUNT[RTRID] and MMCOUNT[RTRID] by adding D to the former at block 973 and the quantity (D - 1) to the latter at block 975. Processing then proceeds to blocks 978 and 983 as before.

Given the values of MMCOUNT[RTRID] and MCOUNT[RTRID], control modem 10 is thus able to report the current value of the missed message rate of the RTRID$^{th}$ tributary to the user on demand (such as in response to a request entered via the modem front panel), that rate being, of course, the ratio of MMCOUNT[RTRID] to MCOUNT[RTRID].

The foregoing is merely illustrative of the principles of the invention. For example, as suggested above, the invention is not limited to the inclusion of particular modem-to-modem data in the trailer, such as TRID, SN or GCKSUM. Other pieces of modem-to-modem data can be used in addition to, or instead of, those just mentioned as is desired for a particular application.

It will thus be appreciated that those skilled in the art will be able to devise numerous arrangements which, although not explicitly shown or described herein, embody the principles of the invention and are thus within its spirit and scope.

What is claimed is:

1. A data transmission system comprising:
 a first modem including means for generating a line signal which represents a stream of user data followed by a predetermined delimiting signal followed by a trailer which contains information-bearing data generated from within said first modem, and
 a second modem for receiving said line signal, said second modem including:
 a received data lead,
 means for providing an indication of the presence of valid received user data on said received data lead, and
 means for terminating said indication in response to the receipt of said delimiting signal,
 whereby terminal equipment associated with said second modem is enabled to initiate the transmission of data at a point in time at which the portion of said line signal containing said trailer is still being received by said second modem.

2. The invention of claim 1 wherein said information-bearing data includes data identifying said first modem.

3. The invention of claim 2 wherein said information-bearing data further includes a sequence number that is advanced for every N messages transmitted by said tributary modem, N being a predetermined number.

4. The invention of claim 1 wherein said information-bearing data includes an error-checking code word.

5. The invention of claim 4 wherein said error-checking code word is a checksum.

6. The invention of claim 4 wherein said error-checking code word is a function of both said user data and at least a predetermined portion of the data in said trailer.

7. A first modem comprising:
 means for creating messages to be communicated to a second modem, each said message including user data supplied to said first modem and further including a trailer which follows said user data and which contains information-bearing data generated from within said first modem, and
 means for communicating said messages to said second modem wherein said communicating means communicates said user data and said trailer using predetermined points from a predetermined signal space and wherein said communicating means communicates a synchronization signal between said user data and said trailer, said synchronization signal including at least a first point in said signal space which is other than one of said predetermined points.

8. A method for use in a data transmission system, said method comprising the steps of:
 generating in a first modem in line signal which represents a stream of user data followed by a predetermined delimiting signal followed by a trailer which contains information-bearing data generated from within said first modem,
 receiving said line signal in a second modem, said second modem being of the type which includes a received data lead and means for providing an indication of the presence of valid received user data on said received data lead, and
 terminating said indication in response to the receipt of said delimiting signal, whereby terminal equipment associated with said second modem is enabled to initiate the transmission of data at a point in time at which the portion of said line signal containing said trailer is still being received by said second modem.

9. The invention of claim 8 wherein said information-bearing data includes data identifying said first modem.

10. The invention of claim 9 wherein said information-bearing data further includes a sequence number that is advanced for every N messages transmitted by said tributary modem, N being a predetermined number.

11. The invention of claim 8 wherein said information-bearing data includes an error-checking code word.

12. The invention of claim 11 wherein said error-checking code word is a checksum.

13. The invention of claim 11 wherein said error-checking code word is a function of both said user data and at least a predetermined portion of the data in said trailer.

14. A method for use in a first modem, said method comprising the steps of:
 creating messages to be communicated to a second modem, each said message including user data supplied to said first modem and further including a trailer which follows said user data and which contains information-bearing data generated from within said first modem, and
 communicating said messages to said second modem wherein said communicating means communicates said user data and said trailer using predetermined points from a predetermined signal space and wherein said communicating means communicates a synchronization signal between said user data and said trailer, said synchronization signal including at least a first point in said signal space which is other than one of said predetermined points.

15. A method for use in a first modem adapted to communicate with a second modem over a voiceband telephone line, said method comprising the steps of:
 transmitting over said telephone line a line signal which includes a stream of symbols representing at least a first message, said message including, in the order named, user data, a synchronization symbol and a trailer which includes modem-to-modem data generated by said first modem and which identifies at least a first characteristic of said message,
 receiving said line signal in a second modem, said second modem being of the type which includes a received data lead and means for providing an indication of the presence of valid received user data on said received data lead, and
 terminating said indication in response to the receipt of said synchronization symbol, whereby terminal equipment associated with said second modem is enabled to initiate the transmission of data at a point in time at which the portion of said line signal containing said trailer is still being received by said modem.

16. The invention of claim 15 wherein said modem-to-modem data includes data identifying said first modem.

17. The invention of claim 17 wherein said modem-to-modem data further includes a sequence number that is advanced for every N messages transmitted by said first modem, N being a predetermined number.

18. The invention of claim 17 wherein said modem-to-modem data includes an error-checking code word.

19. The invention of claim 19 wherein said error-checking code word is a checksum.

20. The invention of claim 19 wherein said error-checking code word is a function of both said user data and at least a predetermined portion of the data in said trailer.

* * * * *